(12) United States Patent
Dogishi et al.

(10) Patent No.: US 11,790,307 B2
(45) Date of Patent: Oct. 17, 2023

(54) INFORMATION PROCESSING DEVICE, INFORMATION PROCESSING METHOD AND NON-TRANSITORY STORAGE MEDIUM

(71) Applicant: TOYOTA JIDOSHA KABUSHIKI KAISHA, Toyota (JP)

(72) Inventors: Hiromichi Dogishi, Nagoya (JP); Masaki Shitara, Nagakute (JP); Keiji Yamashita, Nisshin (JP); Nozomi Kaneko, Nagoya (JP); Naoki Yamamuro, Nagoya (JP); Shunsuke Tanimori, Susono (JP); Ryoichi Shiraishi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 684 days.

(21) Appl. No.: 16/742,199

(22) Filed: Jan. 14, 2020

(65) Prior Publication Data

US 2020/0269878 A1 Aug. 27, 2020

(30) Foreign Application Priority Data

Feb. 22, 2019 (JP) ................................ 2019-030455

(51) Int. Cl.
*G06Q 10/0832* (2023.01)
*G06Q 10/0833* (2023.01)
*G06Q 10/0835* (2023.01)

(52) U.S. Cl.
CPC ..... *G06Q 10/0832* (2013.01); *G06Q 10/0833* (2013.01); *G06Q 10/08355* (2013.01)

(58) Field of Classification Search
CPC ........... G06Q 10/0832; G06Q 10/0833; G06Q 10/08355
See application file for complete search history.

(56) References Cited

U.S. PATENT DOCUMENTS

| 11,222,299 B1 * | 1/2022 | Baalke ................. G06Q 10/087 |
| 2016/0019497 A1 * | 1/2016 | Carvajal ............... H04L 67/104 |
| | | 705/333 |

(Continued)

FOREIGN PATENT DOCUMENTS

JP 2018-124676 A 8/2018

OTHER PUBLICATIONS

Louis Faugere, Hyperconnected Pickup & Delivery Locker Networks, Jul. 2017, p. 2-4 (Year: 2017).*

*Primary Examiner* — Ibrahim N El-Bathy
(74) *Attorney, Agent, or Firm* — Oblon, McClelland, Maier & Neustadt, L.L.P.

(57) ABSTRACT

An information processing device executes: identifying a first region where a predetermined module is insufficient in number, the predetermined module being a module that is attachable to and detachable from a movable object; identifying a second region where the predetermined module is superfluous in number; instructing a movable object equipped with the predetermined module in the second region to provide the superfluous predetermined module to a predetermined movable object; instructing the predetermined movable object to cause the predetermined module to be attached in the second region and transport the predetermined module to the first region; and instructing a movable object not equipped with the predetermined module in the first region to receive the predetermined module transported to the first region by the predetermined movable object.

3 Claims, 7 Drawing Sheets

(56) References Cited

U.S. PATENT DOCUMENTS

2018/0033235 A1* 2/2018 Dotterweich ........... G07F 17/12
2018/0217598 A1 8/2018 Kuhara
2019/0066041 A1* 2/2019 Hance .................. G01C 21/343
2019/0130349 A1* 5/2019 Ferguson ............. G06Q 10/083
2020/0023764 A1* 1/2020 Keiser ............. G06Q 10/06311

* cited by examiner

FIG. 5

| VEHICLE ID | POSITIONAL INFORMATION | MODULE | WORKING STATUS |
|---|---|---|---|
| V01 | R01 | A001 | STANDBY |
| | | A002 | STANDBY |
| | | A003 | WORKING |
| | | A004 | STANDBY |
| V02 | R02 | A001 | STANDBY |
| | | A002 | STANDBY |
| | | A005 | WORKING |
| | | – | – |
| V03 | R03 | A001 | WORKING |
| | | – | – |
| | | – | – |
| | | – | – |
| ... | ... | ... | ... |

| REGION | MODULE | REQUIRED NUMBER |
|--------|--------|-----------------|
| L001   | A001   | 5               |
| L002   | A002   | 13              |
| L003   | A003   | 2               |
| L004   | A004   | 10              |
| ...    | ...    | ...             |

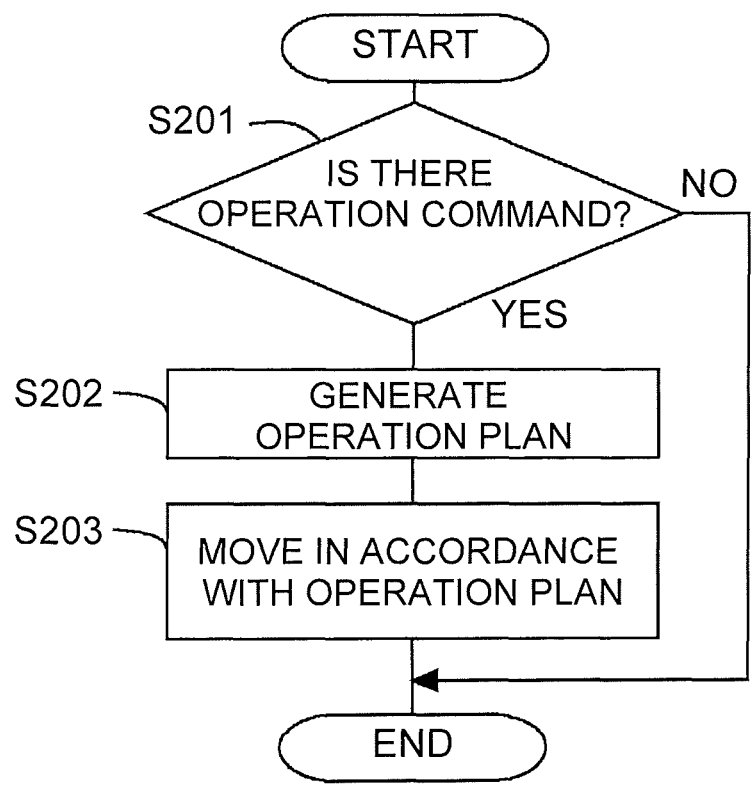

INFORMATION PROCESSING DEVICE, INFORMATION PROCESSING METHOD AND NON-TRANSITORY STORAGE MEDIUM

INCORPORATION BY REFERENCE

The disclosure of Japanese Patent Application No. 2019-030455 filed on Feb. 22, 2019 including the specification, drawings and abstract is incorporated herein by reference in its entirety.

BACKGROUND

1. Technical Field

The disclosure relates to an information processing device, an information processing method and a non-transitory storage medium.

2. Description of Related Art

There is known a system to check whether a parcel can be delivered by a movable object that performs autonomous traveling when a method of delivery of the parcel by the movable object that performs the autonomous traveling is designated (see Japanese Patent Application Publication No. 2018-124676 (JP 2018-124676 A), for example).

SUMMARY

JP 2018-124676 A includes the description about the movable object that performs the delivery of the parcel, but includes no description about another service. Therefore, for application to another service, there is room for improvement. An object of the disclosure is to efficiently use a module of a movable object.

An aspect of the disclosure is an information processing device including a control unit that executes: identifying a first region where a predetermined module is insufficient in number, the predetermined module being a module that is attachable to and detachable from a movable object; identifying a second region where the predetermined module is superfluous in number; instructing a movable object equipped with the predetermined module in the second region to provide the superfluous predetermined module to a predetermined movable object; instructing the predetermined movable object to cause the predetermined module to be attached in the second region and transport the predetermined module to the first region; and instructing a movable object not equipped with the predetermined module in the first region to receive the predetermined module transported to the first region by the predetermined movable object.

An aspect of the disclosure is an information processing method in which a computer executes: identifying a first region where a predetermined module is insufficient in number, the predetermined module being a module that is attachable to and detachable from a movable object; identifying a second region where the predetermined module is superfluous in number; instructing a movable object equipped with the predetermined module in the second region to provide the superfluous predetermined module to a predetermined movable object; instructing the predetermined movable object to cause the predetermined module to be attached in the second region and transport the predetermined module to the first region; and instructing a movable object not equipped with the predetermined module in the first region to receive the predetermined module transported to the first region by the predetermined movable object.

An aspect of the disclosure is a non-transitory storage medium storing instructions that are executable by one or more processors and that cause the one or more processors to perform functions including: identifying a first region where a predetermined module is insufficient in number, the predetermined module being a module that is attachable to and detachable from a movable object; identifying a second region where the predetermined module is superfluous in number; instructing a movable object equipped with the predetermined module in the second region to provide the superfluous predetermined module to a predetermined movable object; instructing the predetermined movable object to cause the predetermined module to be attached in the second region and transport the predetermined module to the first region; and instructing a movable object not equipped with the predetermined module in the first region to receive the predetermined module transported to the first region by the predetermined movable object.

With the disclosure, it is possible to efficiently use the module of the movable object.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram illustrating a table configuration of vehicle information;

FIG. 9 is an example of a flowchart of a process of causing the vehicle to travel according to the embodiment.

DETAILED DESCRIPTION OF EMBODIMENTS

Figure 1:
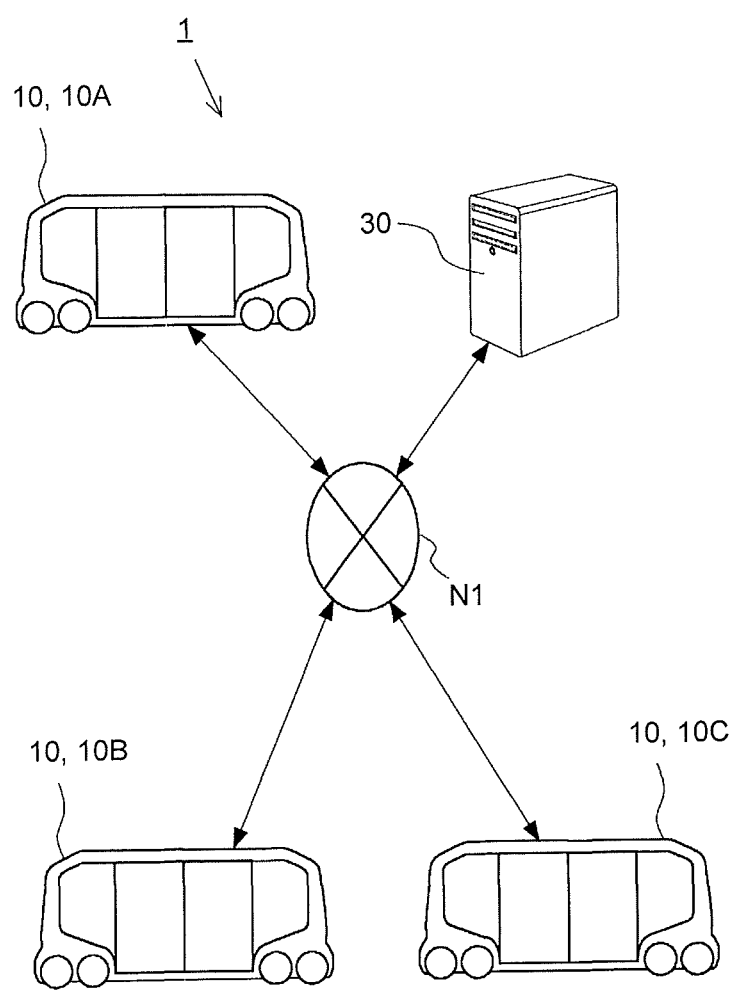
FIG. 1 is a diagram showing a schematic configuration of an automatic driving system according to an embodiment.

For example, an information processing device that is an aspect of the disclosure may be included in a movable object, or may be included in a server that manages the movable object. The movable object may be a movable object that can be equipped with only one module, or may be a movable object that can be equipped with two or more modules. Further, multiple kinds of movable objects different in the number of modules that can be equipped may exist in a mixed manner. A control unit instructs a movable object equipped with a predetermined module in a second region to provide a superfluous predetermined module to a predetermined movable object. For example, the control unit instructs the movable object equipped with the predetermined module to move to a factory and cause the predetermined module to be detached in the factory, or instructs the movable object equipped with the predetermined module to directly give the predetermined module to the predetermined movable object. The predetermined movable object can be equipped with a plurality of predetermined modules. Examples of the predetermined movable object include a dedicated movable object that transports the predetermined module, a movable object that goes to get the predetermined module from a first region, a movable object that is equipped with one or more predetermined modules in the second region, a movable object that is not equipped with the predetermined module in the second region, and a movable object that is disposed in another region other than the first region and the second region. In the second region, instead of the predetermined module, another module may be equipped in the movable object that provides the predetermined module.

The control unit instructs the predetermined movable object to cause the predetermined module to be attached in the second region and transport the predetermined module to the first region. Examples of the instruction include an instruction to cause the predetermined module to be attached in the second region, an instruction to transport the predetermined module from the second region to the first region, and an instruction to provide the predetermined module in the first region. The instruction to provide the predetermined module may be an instruction to cause the predetermined module to be detached in a factory, or may be an instruction to directly give the predetermined module to a movable object in the first region. The predetermined module transported to the first region by the predetermined movable object is provided to a movable object in the first region that is not equipped with the predetermined module. The control unit instructs the movable object not equipped with the predetermined module in the first region to receive the predetermined module. Examples of the instruction include an instruction to travel to a factory and cause the predetermined module to be attached in the factory and an instruction to directly receive the predetermined module from the predetermined movable object.

In this way, the insufficiency of the predetermined module in the first region can be resolved by the predetermined module transported from the second region, and therefore, it is possible to efficiently use the predetermined module. Accordingly, it is not necessary to prepare more predetermined modules than is needed, and therefore, it is possible to reduce the cost of production of the predetermined module. Further, although warehouses and the like for preserving predetermined modules are necessary when more predetermined modules than is needed are prepared, it is possible to reduce the warehouses and the like.

The control unit may identify the first region based on data acquired by a sensor that is included in the movable object and that detects a surrounding environment.

For example, in the case where an image sensor detects, for example, a disaster such as a fire, the control unit may identify the first region by determining that a module allowing the movable object to function as an ambulance car or a fire truck is insufficient in number. Further, the number of modules that are needed can vary depending on the scale of the disaster or the like. Accordingly, the control unit may know the scale of the disaster or the like based on the data acquired by the sensor, and may determine whether the module is insufficient in number. The control unit may identify the first region based on a demand from a user. For example, when the user performs an event, a module allowing the movable object to function as a lighting equipment or audio equipment can be insufficient in number. In such a case, with the demand from the user, the control unit can easily identify the first region.

The control unit may identify the second region based on a working state of the predetermined module.

For example, when the predetermined module is in the working state, the control unit may determine that the predetermined module is not superfluous in number. Further, for example, when the predetermined module is not in the working state, the control unit may determine that the predetermined module is superfluous in number. In this way, the control unit can easily identify the second region.

Hereinafter, embodiments of the disclosure will be described based on the drawings. The following configurations of the embodiments are examples, and the disclosure is not limited to the configurations of the embodiments. Further, the following embodiments can be combined if possible.

Embodiment

Outline of Automatic Driving System

FIG. 1 is a diagram showing a schematic configuration of an automatic driving system 1 according to an embodiment. For example, the automatic driving system 1 includes vehicles 10 and a server 30. Each vehicle 10 is an example of the movable object. Various modules are attachable to and detachable from the vehicle 10. By changing the module that is equipped in the vehicle 10, it is possible to change the function of the vehicle 10. The vehicle 10 can be equipped with a plurality of modules. Each module can be equipped in the vehicle 10, so as not to function.

In the automatic driving system 1, in the case where the predetermined module is insufficient in number in the first region and where the predetermined module is superfluous in number in another region (second region), the vehicle 10 transports the superfluous predetermined module from the second region to the first region. On this occasion, if each vehicle 10 transports the predetermined module from the second region to the first region, transportation cost increases, and therefore, the vehicle 10 that transports the predetermined module from the second region to the first region is equipped with a plurality of predetermined modules. That is, the vehicle 10 equipped with the plurality of predetermined modules in the second region travels to the first region, and then, provides the predetermined modules to a plurality of vehicles 10 in the first region. In this way, in the first region, the insufficiency of the predetermined module is resolved. Further, it is possible to decrease the transportation cost for the module. Further, it is possible to decrease the number of predetermined modules to be produced.

The vehicle 10 and the server 30 are connected with each other through a network N1. As the network N1, for example, a world-scale public communication network such as the internet, a wide area network (WAN), and other communication networks may be employed. Further, the network N1 may include a wireless network such as a telephone communication network for mobile phones or WiFi.

Figure 2:
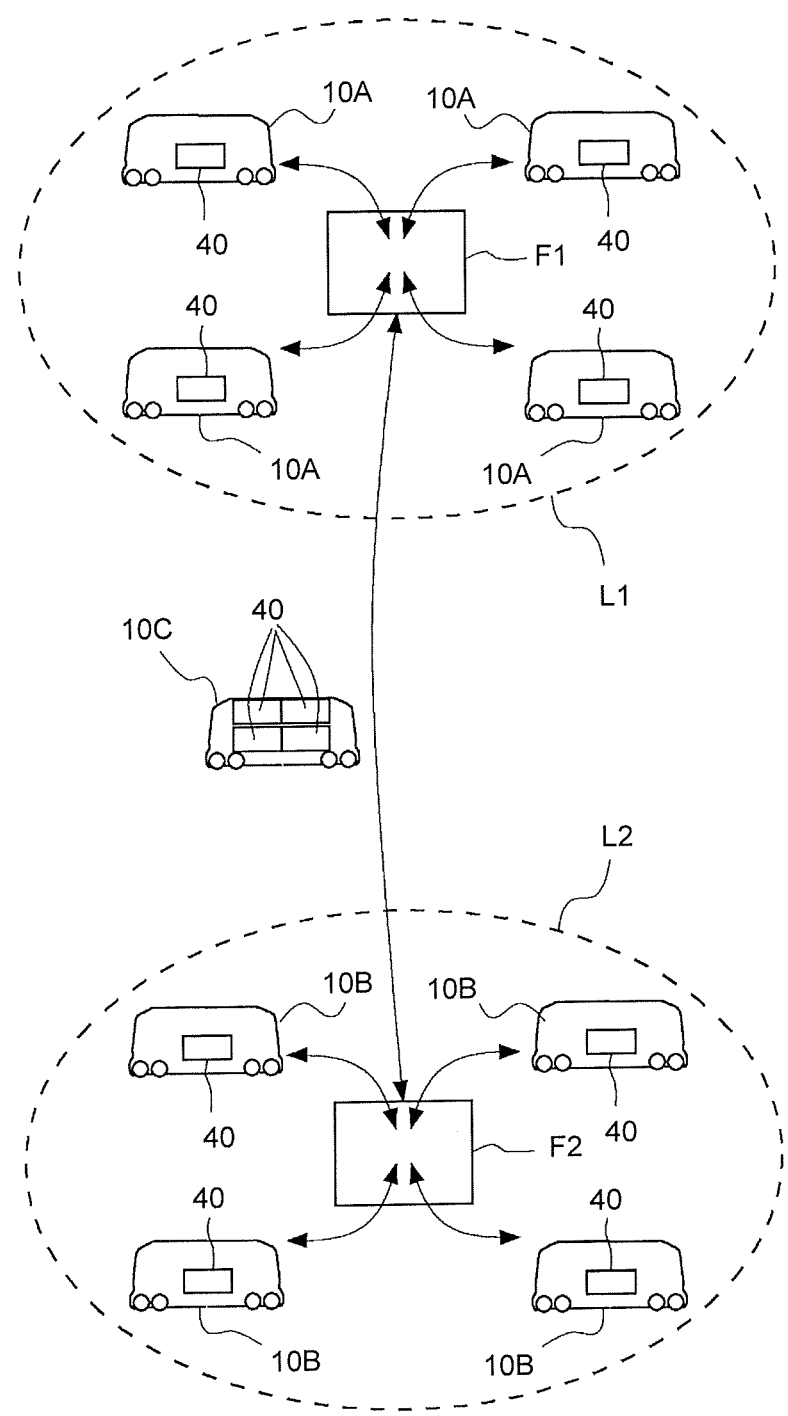
FIG. 2 is a diagram for describing movement of vehicles.

FIG. 2 is a diagram for describing movement of vehicles 10. In FIG. 1 and FIG. 2, vehicles 10A are vehicles (hereinafter, also referred to as first vehicles) that receive modules 40 in a first region L1. Further, vehicles 10B are vehicles (hereinafter, also referred to as second vehicles) that give modules 40 in a second region L2. Further, a vehicle 10C is a vehicle (hereinafter, also referred to as a third vehicle) that is equipped with a plurality of modules 40 and transports the modules 40 from the second region L2 to the first region L1. There may be a plurality of first vehicles 10A, there may be a plurality of second vehicles 10B, and there may be a plurality of third vehicles 10C. Hereinafter, the first vehicle 10A, the second vehicle 10B and the third vehicle 10C are referred to as merely vehicles 10, if being not distinguished. In the first region L1, there is provided a first factory F1 where the module 40 can be attached and detached. In the second region L2, there is provided a second factory F2 where the module 40 can be attached and detached. All modules 40 shown in FIG. 2 are modules that have the same function. For example, each of the modules 40 is a module that allows the vehicle 10 to function as an ambulance car or a fire truck at the time of a disaster, or a module that allows the vehicle 10 to function as a lighting equipment or audio equipment at the time of an event.

The server 30 identifies the first region L1 where the module 40 is insufficient in number, and then, identifies the second region L2 where the module 40 is superfluous in number. The server 30 generates an operation command for instructing the second vehicle 10B in the second region L2 to move to the second factory F2 and cause the module 40 to be detached in the second factory F2. Further, the server 30 generates an operation command for instructing the third vehicle 10C to move to the second factory F2, cause a plurality of modules 40 to be attached, move to the first factory F1, and cause the modules 40 to be detached. Further, the server 30 generates an operation command for instructing the first vehicle 10A to move to the first factory F1 and cause the module 40 to be attached in the first factory F1. The operation commands generated by the server 30 are sent from the server 30 to the vehicles 10. Each vehicle 10 receives the operation command, and then, performs autonomous traveling in accordance with the operation command.

Hardware Configuration

Figure 3:
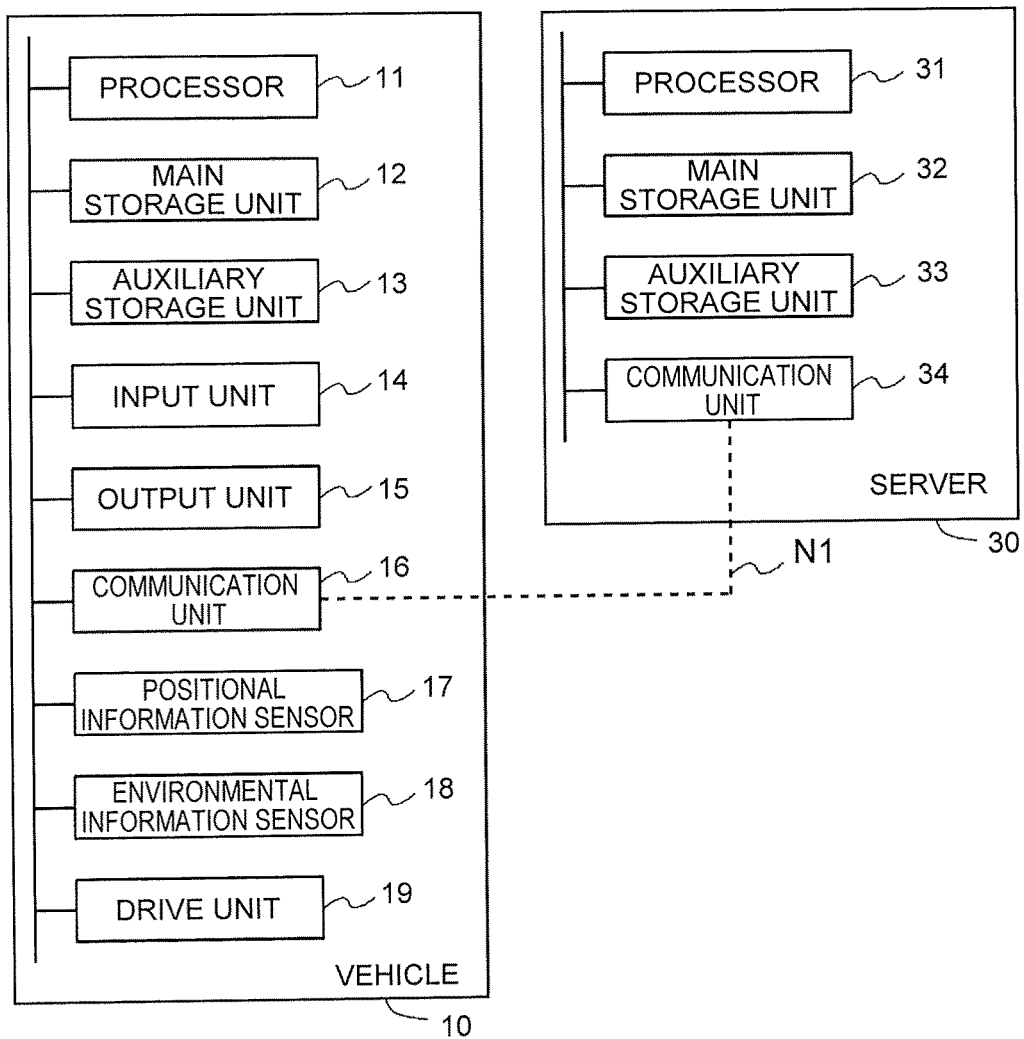
FIG. 3 is a block diagram schematically showing an example of each configuration of a vehicle and a server that constitute the automatic driving system according to the embodiment.

Hardware configurations of the vehicle 10 and the server 30 will be described based on FIG. 3. FIG. 3 is a block diagram schematically showing an example of each configuration of the vehicle 10 and the server 30 that constitute the automatic driving system 1 according to the embodiment.

The server 30 has a general computer configuration. The server 30 includes a processor 31, a main storage unit 32, an auxiliary storage unit 33, and a communication unit 34. They are connected with each other through a bus.

The processor 31 is a central processing unit (CPU), a digital signal processor (DSP), or the like. The processor 31 controls the server 30, and performs various information processing computations. The processor 31 is an example of the "control unit". The main storage unit 32 is a random access memory (RAM), a read only memory (ROM), or the like. The auxiliary storage unit 33 is an erasable programmable ROM (EPROM), a hard disk drive (HDD), a removable medium, or the like. In the auxiliary storage unit 33, an operating system (OS), various programs, various tables and the like are stored. The programs stored in the auxiliary storage unit 33 are loaded and executed in a work area of the main storage unit 32 by the processor 31, and constituent units and the like are controlled by execution of the programs. Thereby, the server 30 realizes a function consistent with a predetermined purpose. Each of the main storage unit 32 and the auxiliary storage unit 33 is a recording medium that can be read by a computer. The server 30 may be constituted by a single computer, or may be constituted by a plurality of cooperating computers. Further, information to be stored in the auxiliary storage unit 33 may be stored in the main storage unit 32. Further, information to be stored in the main storage unit 32 may be stored in the auxiliary storage unit 33.

The communication unit 34 is means for performing communication with the vehicle 10 and a user terminal through the network N1. For example, the communication unit 34 is a local area network (LAN) interface board, or a wireless communication circuit for wireless communication. The LAN interface board or the wireless communication circuit is connected with the network N1.

A series of processes to be executed in the server 30 may be executed by hardware, or may be executed by software. The hardware configuration of the server 30 is not limited to the hardware configuration shown in FIG. 3. Further, a part or whole of the configuration of the server 30 may be equipped in the vehicle 10.

Next, the vehicle 10 will be described. The vehicle 10 includes a processor 11, a main storage unit 12, an auxiliary storage unit 13, an input unit 14, an output unit 15, a communication unit 16, a positional information sensor 17, an environmental information sensor 18, and a drive unit 19. They are connected with each other through a bus. The processor 11, the main storage unit 12 and the auxiliary storage unit 13 are the same as the processor 31, the main storage unit 32 and the auxiliary storage unit 33 of the server 30, and therefore, the description is omitted.

The input unit 14 is means for accepting an input operation by the user, and is a touch panel or a push button, for example. The output unit 15 is means for presenting information to the user, and is a liquid crystal display (LCD), an electroluminescence (EL) panel, a speaker, or a lamp, for example. The input unit 14 and the output unit 15 may be constituted by a single touch panel display. For example, the input unit 14 and the output unit 15 can be used by a user that uses the vehicle 10 or a user that manages the vehicle 10. The communication unit 16 is communication means for connecting the vehicle 10 with the network N1. For example, the communication unit 16 is a circuit for performing communication with another device (for example, the server 30) through the network N1, using a telephone communication network such as a mobile communication service (3rd generation (3G)) and long term evolution (LTE), or wireless communication such as WiFi.

The positional information sensor 17 acquires positional information (for example, latitude and longitude) about the vehicle 10, with a predetermined period. For example, the positional information sensor 17 is a global positioning system (GPS) receiving unit or a WiFi communication unit. For example, the information acquired by the positional information sensor 17 is recorded in the auxiliary storage unit 13 or the like, and is sent to the server 30.

The environmental information sensor 18 is means for sensing a state of the vehicle 10 or sensing a surrounding area of the vehicle 10. As the sensor for sensing the state of the vehicle 10, there are an acceleration sensor, a speed sensor and an azimuth sensor. As the sensor for sensing the surrounding area of the vehicle 10, there are an image sensor, a laser scanner, a LIDAR, a radar and the like.

The drive unit 19 causes the vehicle 10 to travel based on a control command generated by the processor 11. For example, the drive unit 19 is configured to include a motor for driving wheels included in the vehicle 10, an inverter, a brake, a steering mechanism, and the like. The motor, the brake and the like are driven in accordance with the control command, so that the autonomous driving of the vehicle 10 is realized.

Functional Configuration: Server

Figure 4:
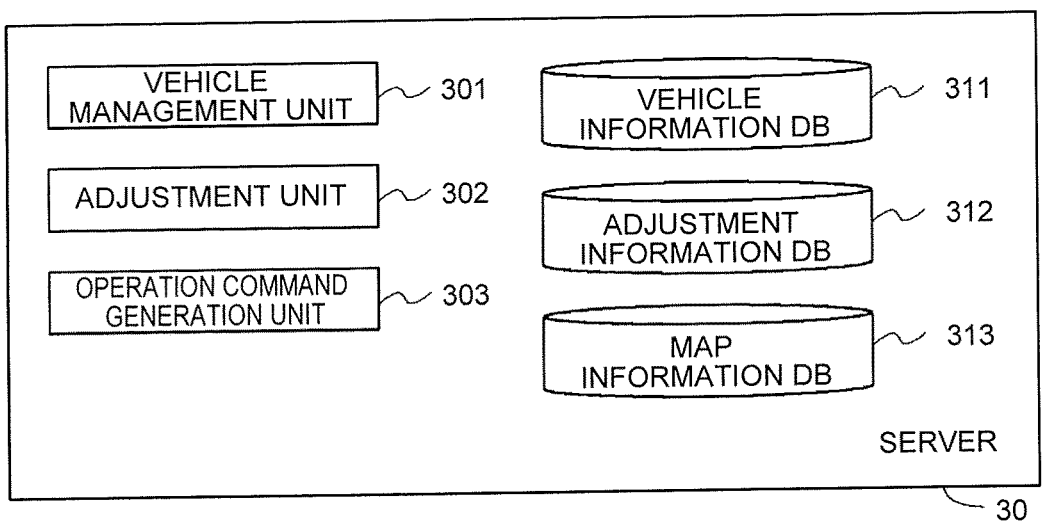
FIG. 4 is a diagram showing an example of a functional configuration of the server.

FIG. 4 is a diagram showing an example of a functional configuration of the server 30. The server 30 includes a vehicle management unit 301, an adjustment unit 302, an operation command generation unit 303, a vehicle information DB 311, an adjustment information DB 312, and a map information DB 313, as functional constituent elements. For example, the vehicle management unit 301, the adjustment unit 302 and the operation command generation unit 303 are functional constituent elements that are provided when the processor 31 of the server 30 executes various programs stored in the auxiliary storage unit 33.

Each of the vehicle information DB 311, the adjustment information DB 312 and the map information DB 313 is, for example, a relational database that is constructed when a program of a database management system (DBMS) to be executed by the processor 31 manages data stored in the auxiliary storage unit 33. Processes by one of the functional constituent elements of the server 30, or some of the processes may be executed by another computer that is connected with the network N1.

The vehicle management unit 301 manages vehicle information. The vehicle information includes positional information about the vehicle 10 and module information about the vehicle 10. The positional information about the vehicle 10 is information relevant to the current position of the vehicle 10, and the module information about the vehicle 10 is information relevant to the module equipped in the vehicle 10. For example, the vehicle management unit 301 acquires and manages the positional information sent from the vehicle 10 with a predetermined period, or the positional information sent from the vehicle 10 in response to a request from the server 30. The vehicle management unit 301 stores the positional information in the vehicle information DB 311, in association with a vehicle ID. For example, the vehicle management unit 301 acquires and manages the module information sent from the vehicle 10 with a predetermined period, or the module information sent from the vehicle 10 in response to a request from the server 30. In the case where the module is equipped in the vehicle 10 by an instruction from the server 30, the vehicle management unit 301 may store information relevant to the module in the instruction from the server 30 to the vehicle 10, in the vehicle information DB 311, in association with the vehicle ID.

Further, the module information about the vehicle 10 includes information indicating a working status of the module. Therefore, the vehicle management unit 301 manages the working status of the module equipped in the vehicle 10. In the case where the vehicle 10 is equipped with a plurality of modules, the vehicle management unit 301 manages the working status of each module. In the case where the module equipped in the vehicle 10 is functioning, it can be said that the module is in a working state. On the other hand, in the case where the module is equipped in the vehicle 10 but is not functioning, it can be said that the module is in a standby state. The vehicle management unit 301 stores the working status of each module, in the vehicle information DB 311, in association with the vehicle ID. For example, the working status may be sent from the vehicle 10 with a predetermined period. Further, in the case where the module works by an instruction from the operation command generation unit 303, the vehicle management unit 301 may acquire the working status in response to an instruction from the operation command generation unit 303.

The adjustment unit 302 adjusts the redundancy or insufficiency of the module for each region. For the adjustment, the adjustment unit 302 identifies the region (first region L1) where the module is insufficient in number and the region (second region L2) where the module is superfluous in number. For example, the adjustment unit 302 identifies the region where the module is insufficient in number, based on a notice from the vehicle 10 or a notice from a predetermined user. The vehicle 10 or the predetermined user may give a notice indicating that the module is insufficient in number, or a notice indicating the region where the module is insufficient in number. The predetermined user includes a predetermined public organization or a predetermined media organization.

At the time of occurrence of the event, the adjustment unit 302 identifies the number of modules that are needed, and compares the number of modules that are needed, with the number of modules that exist in a region where the event occurs. Then, when the number of the modules that exist in the region where the event occurs is smaller than the number of the modules that are needed for the event, the adjustment unit 302 determines that the module is insufficient in number in the region. Thereby, the region where the module is insufficient in number is identified. The number of the modules that exist in the region where the event occurs is acquired from information stored in the later-described vehicle information DB 311. The number of the modules that are needed at the time of the occurrence of the event may be previously decided for each event, or may be decided based on the notice from the predetermined user. The number of the modules that are needed at the time of the occurrence of the event may be changed depending on the scale of the event. The number of modules that correspond to the scale of the event is previously decided. The adjustment unit 302 calculates the number of lacking modules, by subtracting the number of the modules that exist in the region where the event occurs from the number of the modules that are needed for the event.

For example, the adjustment unit 302 detects the occurrence of the disaster, based on a notice from the vehicle 10 that detects the occurrence of the disaster or a notice from the predetermined user. For example, the notice may include information such as the kind of the disaster, the scale of the disaster and the place of the occurrence of the disaster. For example, the vehicle 10 detects the occurrence of the disaster, the kind of the disaster and the scale of the disaster, based on the information sensed by the environmental information sensor 18, and sends the detected information to the server 30. Further, the predetermined user may perform a predetermined input to a terminal or the like possessed by the predetermined user, and thereby, the information relevant to the occurrence of the disaster, the kind of the disaster, the scale of the disaster and the like may be sent to the server 30. When the adjustment unit 302 detects the occurrence of the disaster, the adjustment unit 302 determines whether a module capable of coping with the disaster is insufficient in number in the occurrence region of the disaster. The module capable of coping with the disaster is previously decided depending on the kind of the disaster. Further, the number of modules that are needed depending on the scale of the disaster is previously decided. In the case where the number of the modules that exist in the occurrence region of the disaster is smaller than the number of the modules that are needed depending on the scale of the disaster, the adjustment unit 302 determines that the module is insufficient in number in the occurrence region of the disaster. In this way, the adjustment unit 302 detects the insufficiency of the module, and identifies the first region L1 where the module is insufficiency in number.

Further, the adjustment unit 302 identifies a region where the module that is insufficient in number in the first region L1 is superfluous in number. The vehicle 10 or the predetermined user may give a notice indicating that the module is superfluous in number, or a notice indicating the region where the module is superfluous in number. For example, the number of modules that are needed when no event occurs is previously set for each region, and the adjustment unit 302 determines that the module is superfluous in number in a region where more modules than the number of the modules that are needed exist. Further, for example, for a region where modules have been transported from another region at the time of the occurrence of a previous event, the adjustment unit 302 may determine that the module is superfluous in number, after the event finishes. Further, the adjustment unit 302 may determine that all modules in the standby state are superfluous modules. In this way, the adjustment unit 302 detects that the module is superfluous in number, and identifies the second region L2 where the module is superfluous in number.

After the adjustment unit 302 identifies the first region L1 where the module is insufficient in number and the second region L2 where the module is superfluous in number, the adjustment unit 302 selects the second vehicle 10B from which the module is detached in the second region L2, the third vehicle 10C that transports the module from the second region L2 to the first region L1, and the first vehicle 10A to which the module is attached in the first region L1 For example, as the second vehicle 10B, the adjustment unit 302 selects vehicles 10 that exist in the second region L2 and that are equipped with the module, to a number corresponding to the number of the lacking modules. On this occasion, the adjustment unit 302 may select second vehicles 10B, in the order from the second vehicle 10B closest to the second factory F2. Further, as the first vehicle 10A, the adjustment unit 302 selects vehicles 10 that exist in the first region L1 and that are not equipped with the module, to a number corresponding to the number of the lacking modules. On this occasion, the adjustment unit 302 may select first vehicles 10A, in the order from the first vehicle 10A closest to the first factory F1. Further, the adjustment unit 302 selects the third vehicle 10C, for example, based on the transportation cost and the like. For example, as the third vehicle 10C, the adjustment unit 302 selects a vehicle 10 that can be equipped with more modules, a vehicle 10 that requires the lowest electric power amount for the traveling from the second region L2 to the first region L1, or the like. The adjustment unit 302 may select the third vehicle 10C from vehicles 10 that are previously equipped with the module in the second region L2.

The operation command generation unit 303 generates operation commands respectively corresponding to the first vehicle 10A, the second vehicle 10B and the third vehicle 10C. For the second vehicle 10B, the operation command generation unit 303 generates an operation command to move to the second factory F2 and cause the module to be detached in the second factory F2. For the first vehicle 10A, the operation command generation unit 303 generates an operation command to move to the first factory F1 and cause the module to be attached in the first factory F1. For the third vehicle 10C, the operation command generation unit 303 generates an operation command to move to the second factory F2, cause the module to be attached in the second factory F2, move to the first factory F1, and cause the module to be detached in the first factory F1. The operation command generation unit 303 sends the generated operation commands to corresponding vehicles 10. The operation command generation unit 303 according to the embodiment may generate a movement route based on map information stored in the later-described map information DB 313. The movement route is generated so as to be a route in accordance with a previously decided rule, for example, so as to be a route allowing the shortest movement distance of the vehicle 10, or a route allowing the shortest movement time of the vehicle 10. In this case, the operation command generation unit 303 sends the operation command including the movement route, to the vehicle 10. For the first vehicle 10A equipped with the module, the operation command generation unit 303 generates the operation command such that the first vehicle 10A copes with the event thereafter. In the generation of the operation command for coping with the event, a well-known technology can be used.

The vehicle information is stored in the auxiliary storage unit 33, so that the vehicle information DB 311 is formed, and in the vehicle information DB 311, the vehicle ID and the vehicle information are associated with each other. Here, a configuration of the vehicle information that is stored in the vehicle information DB 311 will be described based on FIG. 5. FIG. 5 is a diagram illustrating a table configuration of the vehicle information. The vehicle information table has fields of vehicle ID, positional information, module and working status. In the vehicle ID field, identification information identifying the vehicle 10 is input. In the positional information field, the positional information sent by the vehicle 10 is input. The positional information is information indicating the current place of the vehicle 10. In the module field, information indicating a module equipped in the vehicle 10 is input. The vehicle 10 can be equipped with a plurality of modules, and in FIG. 5, each vehicle 10 is equipped with four modules. In the working status field, information indicating the working status of the module is input. For example, the working status may be sent from the vehicle 10. "STANDBY" shown in FIG. 5 indicates a state where the module is not working, and "WORKING" indicates a state where the module is working.

Figures 6, 7:
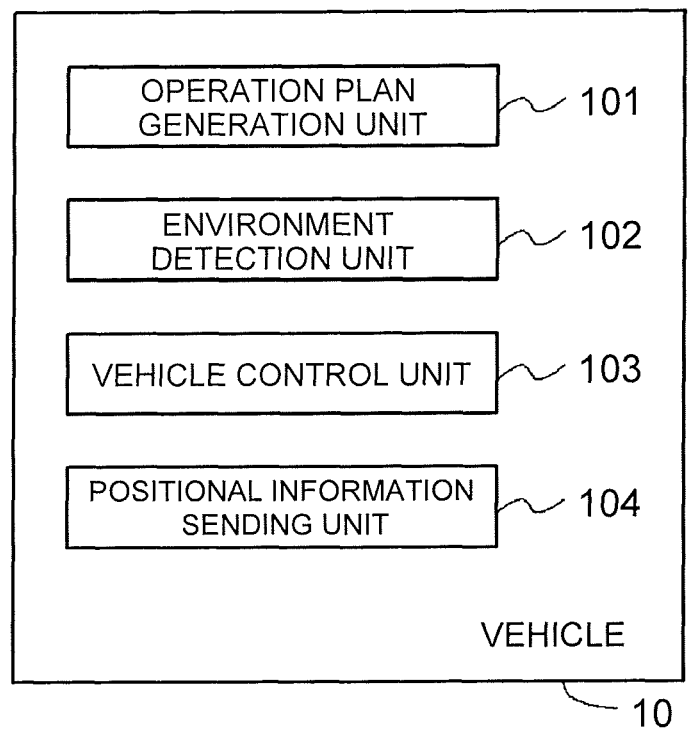
FIG. 6 is a diagram illustrating a table configuration of adjustment information.
FIG. 7 is a diagram showing an example of a functional configuration of the vehicle.

Adjustment information (information relevant to the number of modules that are needed for each region) is stored in the auxiliary storage unit 33, so that the adjustment information DB 312 is formed. Here, a configuration of the adjustment information that is stored in the adjustment information DB 312 will be described based on FIG. 6. FIG. 6 is a diagram illustrating a table configuration of the adjustment information. The adjustment information table has fields of region, module and required number. In the region field, information for identifying a region is input. For example, the region may be set based on an administrative district such as a city, a town or a village. When the adjustment unit 302 identifies the first region, information indicating the first region is input in the region field. In the module field, information for identifying the module that is insufficient in number in the first region is input. In the required number field, information for identifying the number of modules that are needed in the first region is input. For example, the adjustment unit 302 calculates the required number of modules, by subtracting the number of modules that exist in the first region from the number of modules that are needed for the event, and inputs information indicating the required number, in the required number field.

In the map information DB 313, map information including map data and point-of-interest (POI) information such as a character or photograph indicating a characteristic of each spot on the map data is stored. The map information DB 313 may be provided from another system connected with the network N1, for example, from a geographic information system (GIS). The map data includes information relevant to the location of a factory in each region where the module is attachable to and detachable from the vehicle 10.

Functional Configuration: Vehicle

FIG. 7 is a diagram showing an example of a functional configuration of the vehicle 10. The vehicle 10 includes an operation plan generation unit 101, an environment detection unit 102, a vehicle control unit 103, and a positional information sending unit 104, as functional constituent elements. For example, the operation plan generation unit 101, the environment detection unit 102, the vehicle control unit 103 and the positional information sending unit 104 are functional constituent elements that are provided when the processor 11 of the vehicle 10 executes various programs stored in the auxiliary storage unit 13.

The operation plan generation unit 101 acquires the operation command from the server 30, and generates an operation plan for the vehicle 10. The operation plan generation unit 101 calculates the movement route of the vehicle 10, based on the operation command given from the server 30, and generates an operation plan for moving along the movement route.

The environment detection unit 102 detects an environment in the periphery of the vehicle 10 that is necessary for autonomous traveling, based on the data acquired by the environmental information sensor 18. For example, objects to be detected are the number and positions of lanes, the number and positions of other movable objects existing in the periphery of the vehicle 10, the number and positions of obstacles (for example, a pedestrian, a bicycle, a structure and a building) existing in the periphery of the vehicle 10, the structure of the road, traffic signs, and the like, but are not limited to them. Any object may be detected if the object is necessary for autonomous traveling. For example, in the case where the environmental information sensor 18 is a stereo camera, the detection of physical objects in the periphery of the vehicle 10 is performed by image processing of image data picked up by the stereo camera. Data (hereinafter, referred to as environmental data) that is relevant to the peripheral environment of the vehicle 10 and that is detected by the environment detection unit 102 is sent to the later-described vehicle control unit 103. Further, the environment detection unit 102 detects the occurrence of the event, based on the data acquired by the environmental information sensor 18. For example, the environment detection unit 102 detects the occurrence of the disaster, based on an image picked up by the image sensor.

The vehicle control unit 103 generates a control command for controlling the autonomous traveling of the vehicle 10, based on the operation plan generated by the operation plan generation unit 101, the environmental data generated by the environment detection unit 102, and the positional information about the vehicle 10 acquired by the positional information sensor 17. For example, the vehicle control unit 103 generates the control command, such that the vehicle 10 travels along a predetermined route and no obstacle enters a predetermined safety area around the vehicle 10. The generated control command is sent to the drive unit 19. As a method for generating the control command for the autonomous movement of the vehicle 10, a known method can be employed.

The positional information sending unit 104 sends the positional information acquired from the positional information sensor 17, to the server 30, through the communication unit 16. The timing when the positional information sending unit 104 sends the positional information can be appropriately set. For example, the positional information may be sent periodically, may be sent at the timing when the positional information sending unit 104 sends some kind of information to the server 30, or may be sent in response to a request from the server 30. The positional information sending unit 104 sends the positional information to the server 30, together with the identification information (vehicle ID) uniquely identifying the own vehicle. The vehicle ID identifying the vehicle 10 is previously assigned.

Processing Flow: Server

Figure 8:
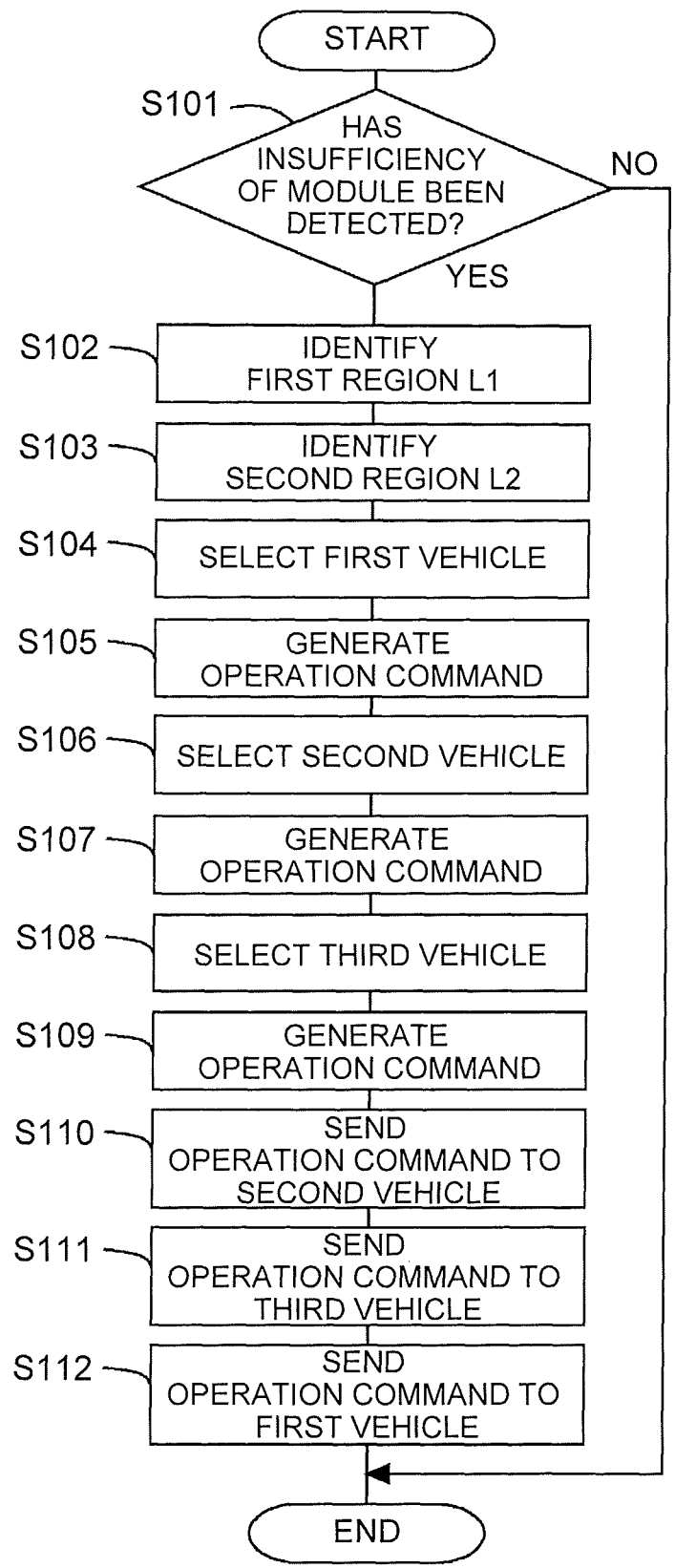
FIG. 8 is an example of a flowchart of a process of sending an operation command according to the embodiment.

Next, a process by which the server 30 sends the operation command to the vehicle 10 will be described. FIG. 8 is an example of a flowchart of a process of sending the operation command according to the embodiment. The process shown in FIG. 8 is executed by the processor 31 of the server 30, at a predetermined time interval. Here, it is assumed that the server 30 has already received necessary information for constructing the vehicle information DB 311 and the adjustment information DB 312.

In step S101, the adjustment unit 302 determines whether the insufficiency of the module has been detected. The adjustment unit 302 accesses the adjustment information DB 312, and determines whether the first region L1 where the module is insufficient in number has been newly added. In the case where the positive determination is made in step S101, the routine proceeds to step S102, and in the case where the negative determination is made, the routine ends.

In step S102, the adjustment unit 302 identifies the first region L1. The adjustment unit 302 accesses the adjustment information DB 312, and identifies the first region L1 where the module is insufficient in number. Next, in step S103, the adjustment unit 302 identifies the second region L2. The adjustment unit 302 accesses the vehicle information DB 311, and picks up a region where the number of modules each of which is the same as the insufficient module in step S102 and has the working status of "STANDBY" is equal to or more than the required number in the first region L1. A region where each vehicle 10 is disposed is identified based on the positional information about each vehicle 10. The region picked up in this way is identified as the second region L2 where the module is superfluous in number.

In step S104, the adjustment unit 302 selects the first vehicle 10A. The adjustment unit 302 selects first vehicles 10A, to the required number of modules, from vehicles 10 that exist in the first region L1 identified in step S102 and that are not equipped with the module. For example, the adjustment unit 302 may select the first vehicles 10A, in the order from the first vehicle 10A closest to the first factory F1. In step S105, the operation command generation unit 303 generates the operation commend for the first vehicle 10A. For the first vehicle 10A, the operation command generation unit 303 generates the operation command to move to the first factory F1 and cause the module to be attached in the first factory F1.

In step S106, the adjustment unit 302 selects the second vehicle 10B. The adjustment unit 302 selects second vehicles 10B, to the required number of modules, from second vehicles 10B that are positioned in the second region L2 identified in step S103 and that are equipped with the module having the working status of "STANDBY". For example, the adjustment unit 302 may select the second vehicles 10B, in the order from the second vehicle 10B closest to the second factory F2. In step S107, the operation command generation unit 303 generates the operation command for the second vehicle 10B. For the second vehicle 10B, the operation command generation unit 303 generates the operation command to move to the second factory F2 and cause the module to be detached in the second factory F2.

In step S108, the adjustment unit 302 selects the third vehicle 10C. The adjustment unit 302 selects third vehicles 10C, to the required number of modules, from vehicles 10 that are positioned in the second region L2 identified in step S103. The third vehicle 10C is equipped with a plurality of modules of the same kind. In step S109, the operation command generation unit 303 generates the operation command for the third vehicle 10C. For the third vehicle 10C, the operation command generation unit 303 generates the operation command to move to the second factory F2, cause a plurality of modules to be attached, move to the first factory F1, and cause the modules to be detached.

In the second factory F2, the module may be transferred from the second vehicle 10B to the third vehicle 10C by a person, or may be transferred from the second vehicle 10B to the third vehicle 10C by an automated machine. Further, in the first factory F1, the module may be transferred from the third vehicle 10C to the first vehicle 10A by a person, or may be transferred from the third vehicle 10C to the first vehicle 10A by an automated machine. The transfer of the module may be performed, for example, in a parking place or the like, without being limited to the first factory F1 and the second factory F2. In the first factory F1, a module that is equipped in the first vehicle 10A and that is not needed at the present time may be transferred to the third vehicle 10C. Further, in the second factory F2, a module that is equipped in the third vehicle 10C and that is not needed at the present time may be transferred to the second vehicle 10B. The third vehicle 10C may be a vehicle that goes to get the module from the first region L1 to the second region L2. The third vehicle 10C may move to the second region L2 from a region other than the first region L1 and the second region L2, and may cause the module to be attached. The third vehicle 10C may cause the module to be further attached in another region, halfway through the movement from the second region L2 to the first region L1.

Then, in step S110, the operation command generation unit 303 sends the operation command to the second vehicle 10B. In step S111, the operation command generation unit 303 sends the operation command to the third vehicle 10C. In step S112, the operation command generation unit 303 sends the operation command to the first vehicle 10A. The routine may proceed to step S111 after the process of step S110 finishes and a required number of modules gather in the second region L2, and then, the operation command generation unit 303 may send the operation command to the third vehicle 10C. Further, the routine may proceed to step S112 after the process of step S111 finishes and the third vehicle 10C arrives in the first region L1, and then, the operation command generation unit 303 may send the operation command to the first vehicle 10A.

Processing Flow: Vehicle

Next, a process of causing the vehicle 10 to travel will be described. FIG. 9 is an example of a flowchart of the process of causing the vehicle 10 to travel according to the embodiment. The process shown in FIG. 9 is executed by the processor 11 of the vehicle 10, at a predetermined time interval. The flowchart is executed by the vehicle 10 in the standby state.

In step S201, the operation plan generation unit 101 determines whether the operation command has been received from the server 30. In the case where the positive determination is made in step S201, the routine proceeds to step S202, and in the case where the negative determination is made, the routine ends. In step S202, the operation plan generation unit 101 generates the operation plan in accordance with the operation command. In step S203, the vehicle control unit 103 generates the control command in accordance with the operation plan, and the drive unit 19 is controlled in accordance with the control command, so that the vehicle 10 moves. For example, the second vehicle 10B moves to the second factory F2, the first vehicle 10A moves to the first factory F1, and the third vehicle 10C first moves to the second factory F2 and then moves to the first factory F1. The third vehicle 10C may cause a different module to be attached in the first region L1, may return to the second region L2, and may provide the different module to the second vehicle 10B in the second region L2.

As described above, with the embodiment, the vehicle 10 transports the module by autonomous traveling from the region where the module is superfluous in number to the region where the module is insufficient in number, and therefore, it is possible to restrain the module from being insufficient in number in a particular region. Here, when modules are prepared in consideration of the occurrence of the event and the like in all regions, it is necessary to produce more modules, leading to the increase in cost. Further, when no event occurs, places for preserving modules are needed. In contrast, with the automatic driving system 1 according to the embodiment, it is not necessary to prepare more modules than is needed, and it is only necessary to provide a preservation place having a small area, so that the cost can be reduced. Further, by exchanging modules between the vehicles 10, it is not necessary to separately provide places for preserving modules.

OTHER EMBODIMENTS

The above embodiment is just an example, and the disclosure can be appropriately modified to be carried out, without departing from the spirit of the disclosure.

The processes and means described in the disclosure can be arbitrarily combined to be carried out, as long as the technical consistency is kept.

A process described as a process to be executed by a single device may be executed by a plurality of devices in cooperation. Further, processes described as processes to be executed by different devices may be executed by a single device. In the computer system, the hardware configuration (server configuration) to realize each function can be flexibly modified. In the above embodiment, the server 30 includes the vehicle management unit 301, the adjustment unit 302, the operation command generation unit 303, the vehicle information DB 311, the adjustment information DB 312 and the map information DB 313, as functional constituent elements. However, some or all of the functional constituent elements may be included in the vehicle 10. For example, a vehicle 10 that serves as the server 30 may be disposed in each region. Further, each vehicle 10 may have the same function as the server 30. In this case, the information indicating the insufficiency of the module may be sequentially transmitted to peripheral vehicles 10, using inter-vehicle communication.

The disclosure can be realized also when a computer program in which the functions described in the above embodiment are implemented is supplied to a computer and one or more processors included in the computer read and execute the program. The computer program may be provided to the computer by a non-transitory computer-readable storage medium that can be connected with a system bus of the computer, or may be provided to the computer through a network. Examples of the non-transitory computer-readable storage medium include an arbitrary type of disk and disc such as a magnetic disk (a Floppy® disk, a hard disk drive (HDD), and the like) and an optical disc (a CD-ROM, a DVD disc, a Blu-ray disc, and the like), a read only memory (ROM), a random access memory (RAM), an EPROM, and EEPROM, a magnetic card, a flash memory, an optical card, and an arbitrary type of medium suitable for storing electronic instructions.

What is claimed is:

1. An information processing device comprising a control unit that executes:
   identifying a first region where a predetermined module is insufficient in number, the predetermined module being a module that is attachable to and detachable from a movable object;
   identifying a second region where the predetermined module is superfluous in number, wherein such identifying the second region where the predetermined module is superfluous in number comprises determining if a predetermined module in a candidate second region is in a working state, and, when the predetermined module in the candidate second region is in a working state, determining that the predetermined module is not superfluous in number in the candidate second region;
   instructing a movable object equipped with the predetermined module in the second region to provide the superfluous predetermined module to a predetermined movable object;
   instructing the predetermined movable object to cause the predetermined module to be attached in the second region and transport the predetermined module to the first region according to a route that is automatically generated based on map data and point-of-interest information stored in a database, and wherein the predetermined movable object uses an environmental information sensor to detect obstacles in a periphery of the predetermined movable object and transports the predetermined module to the first region autonomously along the automatically-generated route such that no obstacle enters a predetermined safety area around the predetermined movable object while the predetermined movable object is travelling from the second region to the first region; and
   instructing a movable object not equipped with the predetermined module in the first region to receive the predetermined module transported to the first region by the predetermined movable object,
   wherein the control unit identifies the first region based on data acquired by a sensor that detects a surrounding environment, the sensor being included in the movable object and wherein the control unit identifies the second region based on a working state of the predetermined module.

2. An information processing method in which a computer executes:
   identifying a first region where a predetermined module is insufficient in number, the predetermined module being a module that is attachable to and detachable from a movable object;
   identifying a second region where the predetermined module is superfluous in number, wherein such identifying the second region where the predetermined module is superfluous in number comprises determining if a predetermined module in a candidate second region is in a working state, and, when the predetermined module in the candidate second region is in a working state, determining that the predetermined module is not superfluous in number in the candidate second region;
   instructing a movable object equipped with the predetermined module in the second region to provide the superfluous predetermined module to a predetermined movable object;
   instructing the predetermined movable object to cause the predetermined module to be attached in the second region and transport the predetermined module to the first region according to a route that is automatically generated based on map data and point-of-interest information stored in a database, and wherein the predetermined movable object uses an environmental information sensor to detect obstacles in a periphery of the predetermined movable object and transports the predetermined module to the first region autonomously along the automatically-generated route such that no obstacle enters a predetermined safety area around the predetermined movable object while the predetermined movable object is travelling from the second region to the first region; and
   instructing a movable object not equipped with the predetermined module in the first region to receive the predetermined module transported to the first region by the predetermined movable object,
   wherein the identifying of the first region is based on data acquired by a sensor that detects a surrounding environment, the sensor being included in the movable object and wherein the identifying of the second region is based on a working state of the predetermined module.

3. A non-transitory storage medium storing instructions that are executable by one or more processors and that cause the one or more processors to perform functions comprising:
   identifying a first region where a predetermined module is insufficient in number, the predetermined module being a module that is attachable to and detachable from a movable object;
   identifying a second region where the predetermined module is superfluous in number, wherein such identifying the second region where the predetermined module is superfluous in number comprises determining if a predetermined module in a candidate second region is in a working state, and, when the predetermined module in the candidate second region is in a working state, determining that the predetermined module is not superfluous in number in the candidate second region;
   instructing a movable object equipped with the predetermined module in the second region to provide the superfluous predetermined module to a predetermined movable object;
   instructing the predetermined movable object to cause the predetermined module to be attached in the second region and transport the predetermined module to the first region according to a route that is automatically generated based on map data and point-of-interest information stored in a database, and wherein the predetermined movable object uses an environmental information sensor to detect obstacles in a periphery of the predetermined movable object and transports the predetermined module to the first region autonomously along the automatically-generated route such that no obstacle enters a predetermined safety area around the predetermined movable object while the predetermined movable object is travelling from the second region to the first region; and instructing a movable object not equipped with the predetermined module in the first region to receive the predetermined module transported to the first region by the predetermined movable object, wherein the identifying of the first region is based on data acquired by a sensor that detects a surrounding environment, the sensor being included in the movable object and wherein the identifying of the second region is based on a working state of the predetermined module.

\* \* \* \* \*